United States Patent
Brett

(10) Patent No.: US 12,377,545 B2
(45) Date of Patent: Aug. 5, 2025

(54) CONSTRUCTION SYSTEM

(71) Applicant: Tobias Brett, Schönefeld (DE)

(72) Inventor: Tobias Brett, Schönefeld (DE)

(73) Assignee: Tobias Brett, Schönefeld (DE)

( * ) Notice: Subject to any disclaimer, the term of this patent is extended or adjusted under 35 U.S.C. 154(b) by 357 days.

(21) Appl. No.: 17/775,120

(22) PCT Filed: Nov. 7, 2020

(86) PCT No.: PCT/EP2020/081403
§ 371 (c)(1),
(2) Date: May 6, 2022

(87) PCT Pub. No.: WO2021/089861
PCT Pub. Date: May 14, 2021

(65) Prior Publication Data
US 2022/0379481 A1    Dec. 1, 2022

(30) Foreign Application Priority Data
Nov. 8, 2019   (DE) .......................... 102019130150.5

(51) Int. Cl.
*B25J 9/16*    (2006.01)
(52) U.S. Cl.
CPC ... *B25J 9/1684* (2013.01); *G05B 2219/45086* (2013.01)
(58) Field of Classification Search
CPC .................. B25J 9/1684; B25J 9/1679; G05B 2219/45086; B65H 69/00
See application file for complete search history.

(56) References Cited

U.S. PATENT DOCUMENTS

| 4,818,150 A | 4/1989 | Jaecklin |
| 6,233,005 B1 | 5/2001 | Cornillault et al. |
| 7,641,461 B2 | 1/2010 | Khoshnevis |
| 10,577,810 B2 * | 3/2020 | Telleria ............... B05B 13/0431 |
| 2008/0247685 A1 | 10/2008 | Kim |
| 2010/0012004 A1 | 1/2010 | Telander |

(Continued)

FOREIGN PATENT DOCUMENTS

| AT | 505253 A2 | 12/2008 |
| CN | 201648879 U | 11/2010 |

(Continued)

OTHER PUBLICATIONS

International Search Report and Written Opinion for Corresponding International Application No. PCT/EP2020/075125 mailing date Feb. 16, 2021.

(Continued)

*Primary Examiner* — Wade Miles
*Assistant Examiner* — Mohammed Yousef Abuelhawa
(74) *Attorney, Agent, or Firm* — MARSHALL, GERSTEIN & BORUN LLP

(57) ABSTRACT

Construction system, particularly for operation by an end-user, comprising a robot device configured for constructing a wall and/or pillar structure, and at least one marking device for defining the course, form and/or position of a wall and/or pillar structure, wherein the marking device is detectable by the robot device, and wherein the robot device is configured to construct a wall and/or pillar structure at and/or along the marking device.

19 Claims, 10 Drawing Sheets

(56) References Cited

U.S. PATENT DOCUMENTS

Figure 1:
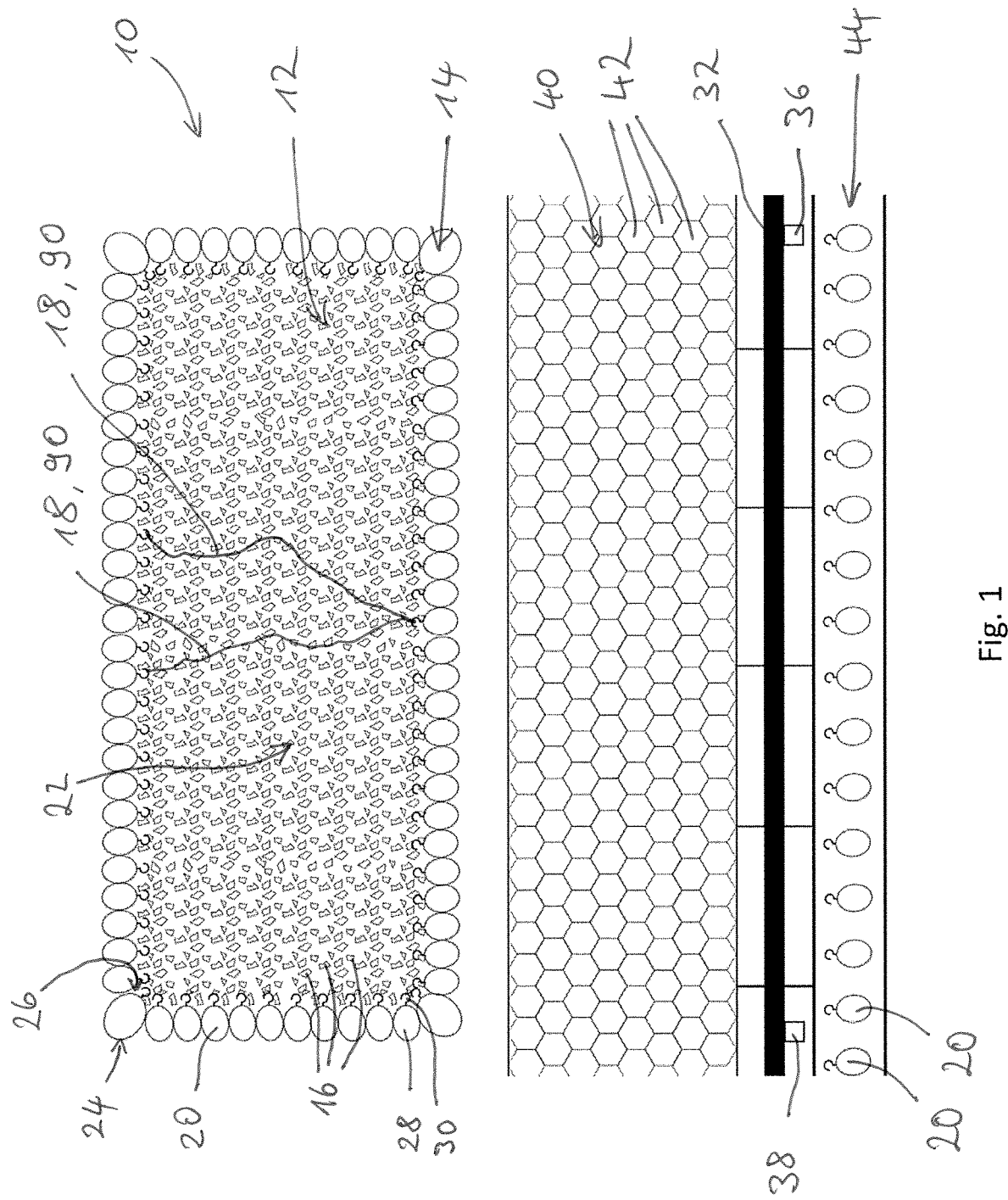

| | | | |
|---|---|---|---|
| 2016/0207220 A1 | 7/2016 | Hack et al. | |
| 2018/0023267 A1 | 1/2018 | Ladkat | |
| 2018/0071949 A1 | 3/2018 | Giles | |
| 2018/0326507 A1* | 11/2018 | Halvorsen | B25J 9/1679 |
| 2020/0171656 A1* | 6/2020 | Diankov | B25J 9/163 |
| 2020/0256051 A1* | 8/2020 | Becerril Hernández | E04B 1/18 |
| 2021/0072727 A1* | 3/2021 | Stanger | B66C 13/48 |
| 2022/0198085 A1* | 6/2022 | Kornaat | G06F 30/13 |

FOREIGN PATENT DOCUMENTS

| | | | |
|---|---|---|---|
| CN | 201665934 U | 12/2010 | |
| CN | 105201220 A | 12/2015 | |
| CN | 107357294 A | 11/2017 | |
| CN | 207739389 U | 8/2018 | |
| CN | 109790723 A | 5/2019 | |
| CN | 110158978 A | 8/2019 | |
| EP | 2317013 A1 | 5/2011 | |
| FR | 2919322 A1 * | 1/2009 | E04G 21/22 |
| GB | 302101 A | 12/1928 | |
| IT | VI20090265 A1 | 4/2011 | |
| JP | H0455508 A | 2/1992 | |
| JP | H0551935 A | 3/1993 | |
| JP | H06108437 A | 4/1994 | |
| JP | H0653631 U | 7/1994 | |
| JP | H0657940 U | 8/1994 | |
| JP | H0747993 A | 2/1995 | |
| JP | H07133098 A | 5/1995 | |
| JP | H08-184065 A | 7/1996 | |
| JP | H1018317 A | 1/1998 | |
| JP | H10277741 A | 10/1998 | |
| JP | 2008280691 A | 11/2008 | |
| JP | 2011153441 A | 8/2011 | |
| KR | 200330335 Y1 | 10/2003 | |
| KR | 20070077549 A | 7/2007 | |
| KR | 100955728 B1 | 5/2010 | |
| KR | 101290272 B1 | 7/2013 | |
| KR | 20150019313 A | 2/2015 | |
| WO | WO-2006090195 A1 | 8/2006 | |
| WO | WO-2008/070913 A1 | 6/2008 | |
| WO | WO-2009044002 A1 * | 4/2009 | E04G 21/22 |
| WO | WO-2018/009985 A1 | 1/2018 | |
| WO | WO-2018009981 A1 | 1/2018 | |
| WO | WO-2019/038491 A1 | 2/2019 | |

OTHER PUBLICATIONS

International Search Report and Written Opinion for Corresponding International Application No. PCT/EP2020/081403 mailing date Apr. 20, 2021.

Lussi Manuel et al., Accurate and Adaptive In Situ Fabrication of an Undulated Wall using an On-Board Visual Sensing System, 2018 IEEE International Conference on Robotics and Automation (ICRA), May 21-25, Brisbane, Australia, pp. 3532-3539.

Aejmelaeus-Lindström Petrus et al., Jammed architectural structures: towards large-scale reversible construction, Granular Matter, Springer-Verlag Berlin Heidelberg, Apr. 8, 2016, 18:28, pp. 1-12.

Search Report for corresponding German Patent Application No. DE 10 2019 130 150.5, dated Sep. 4, 2020.

Chinese Patent Application No. 202080079776.0, Office Action, issued Sep. 5, 2023.

Japanese Patent Application No. 2022-526250, Notice of Reasons for Rejection, dated Sep. 17, 2024.

Search Report and Written Opinion, Turkish Patent Application No. 2022/007379, dated Oct. 18, 2024.

Lloret et al., Complex concrete structures merging existing casting techniques with digital fabrication, Computer-Aided Design, 60:40-9 (Mar. 2014).

European Patent Application No. 20807300.7, Communication Pursuant to Rule 164(2)(b) and Article 94(3) EPC, dated Sep. 2, 2024.

Rock Print Pavilion, Gewerbemuseum Winterthur, downloaded from the Internet at: <https://www.gewerbemuseum.ch/ausstellungen/rock-print-pavilion>, Apr. 11, 2018.

Japanese Patent Application No. 2022-517140, Notice of Reasons for Rejection, mailed Jun. 17, 2024.

Anonymous, BESTonZON Pack of 6 Double Layer Lunch Box Elastic Band Stackable Bento Box Strap Outdoor Lunch Box Strap Bento Box Fixing Band for Office Travel Camping, Amazon.co.uk: Home & Kitchen, retrieved from the Internet at: <https://www.amazon.co.uk/BESTonZON-Elastic-Stackable-Outdoor-Camping/dp/B09L82R5Q8> (Dec. 2, 2018).

European Patent Application No. 20771796.8, Communication Pursuant to Article 94(3) EPC, dated Feb. 27, 2025.

* cited by examiner

CONSTRUCTION SYSTEM

CROSS-REFERENCE TO RELATED APPLICATIONS

This application is a U.S. National Stage of International Patent Application No. PCT/EP2020/081403 filed Nov. 7, 2020, which claims benefit priority of German Patent Application No. 10 2019 130 150.5 filed on Nov. 8, 2019, the respective disclosures of which are each incorporated herein by reference in their entireties.

The present invention refers to a construction system, particularly for operation by an end-user. The present invention furthermore refers to a drive tool, a string device, a robot device and to a planning and/or operation device. The present invention also refers to a method for operation of a construction system.

The concrete industry is responsible for a high amount of $CO_2$ emissions. Constructions, such as walls, for framing land or properties are often built with large amounts of concrete. Concrete constructions, particularly concrete walls, also require a solid foundation and cannot be built on normal soil ground. Accordingly, the building of concrete constructions is regularly associated with high costs. In addition to this, the components of such constructions cannot directly be reused as they need to be recycled. If natural stones are used, their value may be reduced after disassembly, as they are contaminated with concrete residues.

An alternative to conventional concrete constructions are so called "Jammed Architectural Structures". Such constructions may be made of stone fractions or crushed stones being jammed together by pressure and vibration or shaking process. The so called jamming effect may be increased by the use of a string, which may be unwound during the building process throughout the stone structure.

It is known to build so called "Jammed Architectural Structures" with the use of robots. However, such robots require highly skilled operating personnel, a large working space due to their size, and may also lead to a high noise level during operation. The possible application scenarios for the use of robots in building "Jammed Architectural Structures" are therefore limited.

In view of the above, it has been an object of the present invention to provide a construction system, which may be operated with increased flexibility and/or reduced complexity. It has also been an object to provide a drive tool, a string device, a robot device and a planning and/or operation device. Finally, it has been an object to provide a method for operating a construction system.

Concerning the construction system, the above object has been solved by the construction system of the disclosure. A drive tool, a string device, a robot device, and and a planning or operation device are also described herein. A method for operating a construction system is described herein.

A construction system according to the present invention may particularly be suitable for operation by an end-user, such as, for example, an end-consumer and/or an owner or user of a residential estate, property and/or garden land.

A construction system according to the present invention may comprise a robot device configured for constructing a wall and/or pillar structure, and at least one marking device for defining the course, form and/or position of a wall and/or pillar structure. The marking device may be detectable by the robot device, and the robot device may be configured to construct a wall and/or pillar structure at and/or along the marking device.

The use of a marking device in combination with a robot device, which may detect the marking device, may ensure a higher flexibility as well as a lower complexity for the operation of the construction system. In particular, an end-user may lay out the marking device along an intended course and/or position of a wall and/or pillar structure to be built. Subsequently, the robot device may be put into operation for constructing a wall and/or pillar structure along and/or at the marking device with no or only little input by the end-user. The presence of highly skilled operating personnel is therefore no longer required at the construction site.

Accordingly, the robot device may be pre-programmed to detect and/or follow the marking device and/or to conduct construction operations at and/or along the marking device. The pre-programming of the robot device may, in particularly, be such that an end-user with no or only little programming knowledge may initiate construction operations to be conducted by the robot device.

According to a preferred embodiment of the present invention, the marking device may be configured as and/or comprises an elongated and/or flexible device and/or is configured to be laid out by an end-user along an intended course and/or position of a wall and/or pillar structure. The marking device may be provided in a rolled, wound and/or folded fashion and may therefore allow an easy handling by an end-user, particularly before and/or during a laying out procedure.

According to a further preferred embodiment, the marking device may be configured as and/or comprises a wire, cord, tape and/or belt being detectable by a sensor of said robot device. Particularly, the marking device may be configured as and/or comprise a sensor wire being detectable by a sensor of said robot device. Such a marking device may be provided at only little cost and may be easily laid out and/or brought into position for defining the course and/or position of a wall and/or pillar structure.

Preferably, the marking device may comprise a measure scale detectable by said robot device and/or by operating personnel. A measure scale may improve the operating precision before as well as during construction of a wall and/or pillar structure, and also facilitate possible planning activities, such as measuring operations by an end-user.

According to a further preferred embodiment, the marking device may comprise at least a start marker for marking the start of a wall structure and/or the position of a pillar structure to be constructed and/or an end marker for marking the end of a wall structure and/or the position of a pillar structure to be constructed. The start and/or the end of a wall structure and/or the position of a pillar structure may thus be easily detected by the robot device. Therefore the construction of a wall and/or pillar structure with high precision may be ensured.

According to a further preferred embodiment, the marking device may comprise a feature marker, preferably for marking the position of features and/or extensions and/or interruptions or gaps of the wall and/or pillar structure to be constructed. Such an interruption or gap may form an entry gate within the wall and/or pillar structure. The versatility of the construction system and also of the respective construction to be built may therewith be further improved.

Preferably, the marking device may comprise a storage marker for marking the position of a material storage for construction material. The organizational degree for the operation of the construction system may thereby be improved and automation further facilitated.

It is also possible that the marking device comprises a supply marker for marking the position of a power supply and/or a water supply connection. The functionality of the wall and/or pillar structure may thereby be improved, while at the same time ensuring a high level of automation for the construction process.

According to a further preferred embodiment, the construction system further comprises a platform providing a driving and/or rolling surface for the robot device. The robot device, particularly the wheels of the robot device, may be protected from a wet and/or muddy underground. The risk of unintended stops of the robot device during movement or travelling may thereby be reduced.

Preferably, the platform consists of a plurality of platform elements, which allows achieving comparatively large platform surfaces. Furthermore, the platform may be connected with the marking device. The position of the platform relative to the marking device may thereby be maintained with high precision and reliability.

The platform may furthermore comprise a storage section for storing construction material. Preferably, the platform comprises at least one elevation ramp and/or elevation element for providing a driving and/or rolling surface on an elevated level, particularly elevated relative to at least one further platform element. In case a wall and/or pillar structure will be higher than the arm range of the robot device, the robot device may be able to move or drive up the elevation ramp, and follow the line of the marking device on an elevated path. It is then possible to continue with the construction on an elevated level, and therewith construct wall and/or pillar structures with comparatively large height.

According to a further preferred embodiment, the construction system further comprises a delivery marking device for marking a construction material and/or construction equipment delivery zone. Such delivery marking device is detectable by delivery trucks and/or delivery equipment. It is also possible that such delivery marking device is detectable by delivery personnel, with or without using delivery equipment. The delivery marking device may be attached or connected to the marking device for defining the course, form and/or position of a wall and/or pillar structure. The delivery marking device may also be arranged and/or configured to be arranged at a distance from the marking device for defining the course, form and/or position of a wall and/or pillar structure. The delivery of required construction materials and equipment may therewith be further facilitated or automated.

According to a further preferred embodiment, the robot device is configured for constructing a wall and/or pillar structure from solid material pieces and a string for jamming said solid material pieces. More generally, the robot device may be configured for constructing a construction from solid material pieces and a string for jamming said solid material pieces. A construction according to the present invention may particularly be a wall and/or pillar structure, but is not limited thereto. A construction according to the present invention may generally refer to different types, forms and sizes of architectural structures. Particularly, a construction according to the present invention may be an enclosure for the yard of a property, such as a front yard and/or back yard.

According to a further preferred embodiment, the robot device may be configured for constructing a wall and/or pillar structure with a supporting portion and a covering portion for covering the supporting portion, the supporting portion being provided by solid material pieces and at least one string for jamming at least some of the solid material pieces and the covering portion comprising at least one covering device, wherein the robot device is configured for attaching the string to the at least one covering device.

The supporting portion itself may already provide a certain degree of mechanical stability due to the jamming effect, which may particularly be enhanced due to the use of a string. Now, by providing a covering portion with at least one covering device, the outer appearance of the construction may be improved. The string and/or the solid material pieces of the supporting portion may be suitably covered by the covering portion, and therefore less visible or entirely covered.

At the same time, the providing of the covering portion and the attachment of the at least one covering device to the string, allows to further improve the mechanical properties and durability of the construction. The covering portion with the at least one covering device may further enhance the jamming effect within the supporting structure, and particularly prevent single solid material pieces to break out or detach out of the supporting portion. Accordingly, it may also be avoided that loose string portions would hang out of the construction. This reduces the risk of unintended deteriorations or disassembly processes. Due to the attachment of the string with the at least one covering device, the covering device may be suitably held in place and also provide holding support for at least some of the solid material pieces of the supporting structure.

According to the present invention, the term "string" is not limited to textile, synthetic or metallic strings, but may refer to every kind of elongated flexible attachment means. For example, a "string" within the meaning of the present invention may likewise refer to a flexible cable, chain, belt, and/or strap, synthetic fibre or carbon fibre strings, or the like.

According to a preferred embodiment of the present invention, the construction system may be configured to generate a dry construction, particularly a dry wall system or dry pillar system. The assembly or generation process may therewith be facilitated as no water adding and drying steps are required. The construction system according to the present invention may thus be configured to generate such dry construction, particularly such dry wall system or dry pillar system.

According to a preferred embodiment, the construction system may be configured for disassembly, at least for part-disassembling, by pulling out the string of a supporting portion. In particular, the construction system may be configured for disassembly by reversing an assembly process. The quality and/or usability of the single construction components may therefore be maintained also after disassembly. Furthermore, disassembly may be favourable if cleaning the construction does not compensate aging effects, e.g. cleaning equipment does not reach into gaps or pores of solid material pieces or covering devices. Disassembly can then enable individual cleaning of each component until the aging effects are suitably removed.

Furthermore, the construction system may be configured to generate a supporting portion and/or covering portion at least section wise arranged and/or assembled within soil ground and/or below the ground surface and/or within a hole in soil ground, preferably below the frost line. Therewith, the construction may replace a basement or groundwork of an architectural structure, particularly in case of intense ground movements.

According to a further preferred embodiment, the construction system may be configured to generate a covering portion arranged around a supporting portion and/or on a plurality of sides of the supporting portion. The covering portion may provide a cast for the supporting portion, particularly a cast for a compound of the solid material pieces and the string of the supporting portion. The mechanical properties and durability of the construction as well as the outer appearance may thereby be further improved. By providing a cast, the building of the supporting structure may furthermore be facilitated.

According to a further preferred embodiment, the construction system may be configured to generate a construction with at least one covering device made from a different material and/or having a different optical appearance than at least some of the solid material pieces of the supporting structure. The covering device may accordingly be chosen in view of appearance criteria, and the construction system may be configured and/or pre-programmed for selecting according covering devices.

According to a further preferred embodiment, the construction system may be configured to jam and/or stamped and/or compressed solid material pieces, preferably for increasing a jamming effect. The stability of a supporting portion may thereby be further improved.

According to a further preferred embodiment, the construction system may be configured to at least section wise lay a string within and/or throughout a supporting portion and/or between solid material pieces and/or loosely lay and/or at least section wise tighten a string, preferably for increasing a jamming effect. Thereby, the mechanical properties and durability of a supporting portion may further be enhanced.

According to a further preferred embodiment, the construction system may be configured to arrange a string in a pattern alternatingly running between a central area of a supporting portion and different covering devices. The contribution of the string to the jamming effect within the supporting portion may thereby be further improved.

According to a further preferred embodiment, the construction system may be configured to generate a construction with a covering portion comprising a plurality of covering devices, preferably arranged adjacent to each other and/or along and/or adjacent to the supporting portion. A larger surface may thereby be covered and/or a larger cast for the supporting portion be provided. The string may be attached to a plurality of covering devices, preferably to a plurality of covering devices on different sides of the supporting portion. The overall stability of the construction may be further improved in this manner.

According to a yet further preferred embodiment, the at least one covering device may be made of and/or comprises a stone and/or glass and/or metal material. Such materials may provide an aesthetic appearance, while at the same time allowing a sufficient holding functionality for the supporting portion, particularly a stable cast for the supporting portion.

According to a yet further preferred embodiment, the at least one covering device may comprise a visible side facing away from the supporting portion and/or a functional side facing the supporting portion, wherein the construction system may be configured to attach a string to the covering device at the functional side. The functional side may therefore be specifically designed for the attachment of the string, and the visible side be designed or provided for an improved or high quality appearance.

According to a yet further preferred embodiment, the construction system may be configured to compress and/or stamp the solid material pieces against the covering portion and/or against the at least one covering device and/or while being held and/or limited by the at least one covering device. The degree of compression and/or the jamming effect may thereby be further increased, and the string may accordingly be tightened thereby. The overall mechanical properties may thus be further improved.

According to a yet further preferred embodiment, the construction system may be configured to provide an attachment between the string and the at least one covering device via a form fit and/or non-positive connection and/or via an adhesive. Such attachment may provide a high degree of reliability and therewith further improve the long term stability of the construction.

According to a yet further preferred embodiment, the construction system may be configured to generate a construction, in which at least one covering device comprises at least one outer component or a plurality of outer components and at least an attachment element and/or attachment portion for the attachment with a string. The outer component may preferably comprise a visible side facing away from the supporting portion and/or a functional side facing the supporting portion. The attachment element and/or attachment portion may be arranged on the functional side. Accordingly, the attachment element and/or attachment portion may not be visible from the outside or covered by the outer component of the covering device. The outer appearance of the construction may thereby be further improved.

The attachment element and/or attachment portion may be configured as a hook and/or eye and/or notch, to which the string is attached and/or hooked. Such an attachment element and/or attachment portion may be provided with only little costs and may provide a secure and long-lasting attachment. Furthermore, an attachment between the string and such attachment element and/or attachment portion may be established with only little effort by a construction system according to a preferred embodiment of the present invention.

According to a yet further preferred embodiment, the construction system may be configured to identify at least one covering device via an identification device, preferably arranged on an attachment element and/or attachment portion. Such identification device may preferably be configured as flat platform and/or for detection by a sensor or visible for a human and/or configured with a position and/or orientation marker and/or a data code or device ID. This allows an easy identification and also the possibility of tracking single covering devices. This may facilitate the generation of the construction, for example, in order to ensure the correct location of single covering devices, and also replacements of single covering devices.

According to a yet further preferred embodiment, the construction system may be configured to arrange at least one illuminant, preferably a plurality of illuminants and/or a light chain, in a free space between a supporting portion and a visible outer surface of a covering portion. The construction may therewith be further improved in view of an aesthetic appearance and also provide an illumination functionality for the surrounding of the construction, for example for a path or footway along the construction.

Preferably, a plurality of illuminants may be configured to show a light pattern. Such light patterns may be configured for continuous and/or periodic changes, which may further improve the outer appearance or illumination functionality.

According to a yet further preferred embodiment, the construction system may be configured to arrange a plurality of covering devices in a pattern, preferably a predefined and/or optical and/or colour and/or design and/or picture pattern, and/or in a pattern of different stone types, preferably with different aging and/or weathering characteristics, and/or in a pattern with different transparencies and/or translucencies. The possibilities of achieving different design and appearance effects may thereby be further enhanced.

According to a yet further preferred embodiment, the construction system may be configured to arrange two adjacent covering devices at a distance from each other and/or a gap may be provided between two adjacent covering devices. Accordingly, a space between two adjacent covering devices and/or between an outer component of a covering device and a shielding component or shielding portion may be visible from the outside, which may be aesthetic, for example, in case of the arrangement of plants or the like within the construction. Also light may shine through such gaps between two adjacent covering devices.

According to a yet further preferred embodiment, the construction system may be configured to provide a covering portion with a plurality of covering devices and at least some of the covering devices may be arranged in an overhanging configuration and/or overhanging over at least one of the covering devices below. The centre of gravity of an overhanging covering device may be arranged for holding the overhanging covering device in place, preferably also free of any connection to the string. The placement of the overhanging covering device prior to the attachment to the string may thereby be facilitated. Overhanging configurations may allow more complex geometrical overall designs of the construction, and therewith improve the functionality of the construction.

According to a yet further preferred embodiment, the construction system may be configured to enclose a structure connected and/or founded and/or embedded within the respective ground or soil with a supporting portion and/or covering portion. The string may be connected to a structure connected and/or founded and/or embedded within the respective ground or soil. The mechanical overall properties may further be enhanced. Particularly, the construction may be secured against an unintended tilting relative to the ground or soil.

According to a yet further preferred embodiment, the construction system may be configured to provide a top cover portion covering at least the supporting portion from an upper side and/or being positioned on top of a vertically extending side cover portion of the covering portion. The top cover portion may be a 3D printed structure and/or printed as a negative form of the upper surface of the supporting structure and/or the upper surface of the side cover portion. The stability of the construction may thereby be further improved and weathering effects reduced.

According to a yet further preferred embodiment, the top cover portion may be configured to fix and/or receive solid material pieces of the supporting portion and/or covering devices of a vertically extending side cover portion of the covering portion. The top cover portion may have recesses matching to the upper surface of the supporting portion and/or the upper surface of the vertical side cover portion. The top cover portion may be configured as a flat platform, preferably for installation of a roof and/or a light or illumination.

According to a yet further preferred embodiment, the construction system may be configured to provide an intermediate layer between a supporting portion and a covering portion, preferably an intermediate layer of stones. The intermediate layer may be provided by stones or other solid material pieces with a size equal to or larger than a gap between two adjacent covering devices. Stones or material pieces of the intermediate layer may have a round and/or rounded shape. Stones or material pieces of the intermediate layer may be visible through gaps between two adjacent covering devices. Such intermediate layer may again be arranged for aesthetic or appearance reasons. A viewer from the outside may through this be able to see the covering portion as well as an intermediate layer between the covering portion and the supporting portion. Two different types of material layers may thus be recognized.

According to a preferred embodiment of the present invention, the robot device may be configured for operation and/or initialization by an end-user without programming knowledge and/or by an unskilled worker. Furthermore, the robot device may be configured for autonomous operation and/or configured as mobile autonomous robot device. The operation flexibility and versatility may therewith be further improved.

According to a further preferred embodiment of the present invention, the robot device may be configured for following the marker device and for reading markers and/or for drawing the contour of the intended wall and/or pillar structure into a map and/or for creating a 3D model of the environment. The degree of automation and planning functions may therewith be further improved.

According to a further preferred embodiment, the 3D model and/or pictures of the ground for the wall and/or pillar structure to be constructed may be submitted to a provider and/or cloud for data analysis, preferably for automated data analysis and/or manual data analysis by an expert. The risk of failure during operation of the construction system for constructing a wall and/or pillar structure may therewith be further reduced.

According to a further preferred embodiment, the construction system may further comprise an ordering device for ordering construction material based on the data collected by the robot device and/or further analysed. The user friendliness may therewith be further improved.

According to a yet further preferred embodiment, the robot device may be configured to detect and/or identify delivered construction material and/or initiate opening sequences for material packages. The requirements for handling processes to be conducted by an end-user may thus be further reduced.

According to a yet further preferred embodiment, the robot device may comprise a robot, preferably configured with a serial kinematic arrangement, and/or a mobile platform for moving a robot. The robot may have an arm with a serial kinematic arrangement. The robot may be driven or rolled by the mobile platform along a path or line, in particular along the marking device for collecting data and/or for constructing a wall and/or pillar structure. The mobile platform enhances the working range of the robot, and therefore allows the generation of comparatively large structures.

According to a yet further preferred embodiment, the robot device and/or the robot may have a maximum weight of less than 200 kg, preferably less than 150 kg or less than 100 kg. Delivery of the robot device and/or the robot to the construction site may thus be conducted with only little effort. In particular, the robot device and/or the robot may easily be lifted out of a trunk of a car or a loading area of a truck, particularly by one or two persons, with or without lifting equipment, and safely positioned on or close to the construction site.

Preferably, the robot may be attachable to the mobile platform, particularly by an end-user and/or by an unskilled worker and/or in a tool-free manner. The robot and the mobile platform have a modular design. The operation of the robot device by an end-user may thus be further facilitated.

According to a yet further preferred embodiment, the robot device, particularly the robot and/or the mobile platform, may comprise a sensor device for detecting the marking device and/or a detection device for detecting packaged material and/or material packages with or without detection markers. The degree of automation and/or autonomous operability may therewith be further improved.

According to a yet further preferred embodiment, the robot device and/or the robot may be provided with an end-effector configured as a gripper and/or with a drive tool for driving a string, preferably for unwinding a string material and/or for driving a string material out of a string package. Furthermore, such gripper may be configured for gripping solid material pieces, preferably stones, and/or said drive tool for driving a string. The end-effector may thus be used for the gripping, lifting and/or repositioning of solid material pieces. At the same time, the end-effector may be used for gripping a drive tool, which itself has a different basic functionality than the gripper itself. By providing such gripper and also a corresponding drive tool which may be operated while being gripped by the gripper, the necessity of changing the end-effector during operation may be reduced or completely avoided.

According to a further preferred embodiment, the robot device and/or the robot may be provided with a drive tool for driving and/or equipped with a basalt fibre and/or basalt rope, preferably with basalt fibre and/or basalt rope resistive to temperatures above 500° C. or above 600° C. or above 700° C. and/or with recyclable basalt fibre and/or basalt rope. Accordingly, a compound of rock gravel and string may be a compound of basalt material only, particularly without other materials and therefore being very easy for recycling and being resistive to high temperatures during a fire. Also such compound may be able to endure for many years without corrosion, weathering of fibre or other signs of malfunction.

Furthermore, the robot device and/or the robot may be provided with a drive tool for driving and/or equipped with a basalt fibre and/or basalt rope, preferably with bas-alt fibre and/or basalt rope resistive to temperatures above 500° C. or above 600° C. or above 700° C. and/or with recyclable basalt fibre and/or basalt rope. Any construction provided by such construction system may be particularly durable.

It may furthermore prove beneficial in case the robot device and/or the robot is provided with a drive tool for driving and/or equipped with a string and/or basalt fibre and/or basalt rope having between 200 tex to 1000 tex, more preferably between 300 tex to 900 tex or 300 tex to 600 tex or 600 tex to 900 tex or 800 tex to 950 tex or 500 tex to 700 tex or 250 tex to 350 tex, more preferably of about 300 tex, 600 tex or 900 tex. Such string and/or basalt fibre and/or basalt rope may be sufficiently light in weight for good handling purposes.

According to a yet further preferred embodiment, the robot device and/or the robot may be provided with a drive tool for driving and/or equipped with a string and/or basalt fibre and/or basalt rope having configured to withstand a pulling force of 50 N to 500 N, more preferably of 100 N to 300 N, more preferably of 100 N to 200 N or 200 N to 300 N, or about 100 N, 200 N or 300 N. Therewith, sufficient stability of a construction to be built with the construction system may be ensured.

According to a yet further preferred embodiment, the drive tool may be detachable from the robot and/or the gripper together with the respective string and/or string package and/or without any handling by an end-user or operator. Furthermore, the drive tool may be attachable to the robot and/or to the gripper together with the respective string and/or without handling by an end-user or operator.

According to a yet further preferred embodiment, the robot device and/or the robot may be provided with an end-effector configured as a gripper, said gripper being equipped with a set of gripper pads and the geometry of said gripper pads being designed to grip at the flange portion of a covering device by closing gripper fingers, and/or wherein said gripper may be configured as hole gripper. Thereby, pick-and-place operations of covering devices may be conducted with a high degree of operational safety. Also different kind of covering devices may be gripped and replaced if required.

Accordingly, the robot and/or robot device may be connected and/or disconnected from the yet unfinished construction, in order to conduct different tasks without or with only little retooling effort. In other words, the drive tool may be detached from the gripper to remain on top of the yet unfinished wall and/or pillar structure. The robot device may then carry out side tasks and/or stones handling task, particularly moving stones from a bin to the wall and/or pillar structure without any tool change at the end-effector. The robot device is able to reattach the drive tool to the end-effector whenever required.

According to a yet further preferred embodiment, the drive tool may be configured for driving and/or pulling a string out of a string device, particularly out of a string package or string bag, and/or configured for unwinding a string with a defined speed. The automated deployment of a string within a construction, particularly within a wall and/or pillar structure, may therewith be facilitated.

The drive tool may furthermore be configured for detecting an increase of drive forces. A significant increase of drive forces may be indicated that the respective string has reached an end or an end of a string has reached an obstacle, such as a package opening, and therefore a string or string device with a string to be driven by the drive tool needs to be exchanged.

According to a yet further preferred embodiment, the drive tool may comprise a guiding portion for a string, at least one driving wheel for engaging a string to be driven, and at least a coupling portion adapted to the inner shape of a robot gripper and configured to establish a fixed coupling with a robot gripper by closing the fingers of said robot gripper. Such drive tool is particularly suitable for a controlled feeding or driving of a string into a construction. At the same the coupling portion may allow to easily operate such drive tool while being in a position gripped between the fingers of a robot gripper. It is therefore not required to install such drive tool as an end-effector in a conventional manner, but the drive tool itself may be held by an end-effector, and operated in this position.

According to a yet further preferred embodiment, the construction system may further comprise a string device comprising a string, a package for said string and two connector end pieces attached to the ends of said string, wherein the string is guided through a guide through opening of said package and one of the connector end pieces is arranged within the package and/or one of the connector end pieces is arranged outside the package. Such a string device allows an easy integration of a string into a robot device for driving said string. Such a string device may particularly be attached to a driving tool for automated driving of a string.

Further to this, such string device may be replaced with only little effort, and with only little risk of the string being entangled.

According to a yet further preferred embodiment, the connector end pieces may be configured as magnetic end pieces and/or are configured to establish a holding connection with the connector end piece of another string, preferably a holding connection with a portion of the package in between two respective connector end pieces. It may therefore not be required to move the respective string entirely out of a package in order to establish a holding connection with another string, and therefore the handling effort may be reduced.

According to a yet further preferred embodiment, the string device may further comprise a guiding device for said string, preferably a guide through pipe, being attached to the package and/or extending from the guide through opening of the package and/or extending from an outer side of the package. The guiding device may ensure a reliable driving or feeding motion of the string. Furthermore, such guiding device may be attached to the package via an attachment flange. The stability of connection between the guiding device and the package may thus be improved.

According to a yet further preferred embodiment, the guiding device may comprise an exposing portion for exposing a string guided through said guiding device, wherein the exposing portion is preferably provided by an interruption of and/or an opening in said guiding device. Said string may be engaged by a drive tool thorough said exposing portion, particularly for driving and/or pulling said string out of said package. Engagement of the string by a drive tool may be facilitated and a reliable driving functionality ensured.

According to a yet further preferred embodiment, the robot device may be configured for collecting, storing and/or transmitting block chain related data about solid material pieces embedded within a wall and/or pillar structure. The robot device may thus be integrated into a block chain system. The versatility of the construction system is thereby further improved.

Preferably, the robot motion data may provide a proof of work. The ID of a solid material piece, such as a stone, may be assigned by the respective manufacturer and may be unique. Any sequence associated with a material piece ID may be a proof of existence and/or position and/or disassembly of a solid material piece.

In a preferred solution, an end-user may be interested to prove to a trust less block chain system that he is in possession of a stone wall. This may be a proof of physical ownership or possession to a virtual block chain. Block chains may rely on "proof of work", also known as mining. This proof of work could be replaced by another proof of work to any physical reality which, in contrast to most data, may be impossible to be multiplied or copied or faked. In other words, the proof of physical possession may be a suitable replacement for "proof of work", if the object would reveal a code during its production and only reveal it again after destruction or disassembly and/or in case the production or assembly sequence would not allow an operator or end-user to take notice of any block-chain related data to be collected, stored and/or transmitted by the robot device. Preferably, the respective material piece with its ID would be arranged in an immovable manner, at least temporarily immovable. The proof of physical possession may in this way be possible without the need to trust a human person.

In a preferred solution, the robot device may connect the covering devices with a string to hooks below a platform with a stone-id code. The robot device may choose a random sequence of stones and may be configured to store the sequence of stone-ID codes such that when the segment is finished, the robot uses the stone-ID sequence as an encryption key and encrypts data and then deletes the stone-ID code such that the unencrypted sequence is only contained in the wall segment. Thereby, so called "proof of work" or "proof of stake" of may be replaced by a physical proof of possession of a wall segment.

In a preferred embodiment, the robot device electronics and drive for each axis may be located in that respective axis and the electronics comprising an encryption protocol which has an own secret ID and it may also be configured to analyse the axis motion pattern and to create a hash key and submit the hash key to a blockchain.

Submitted data may provide both evidence that a particular robot device has been building a wall and/or pillar structure and the submitted proof of building a wall and/or pillar structure may be the result from that particular robot device building this wall and/or pillar structure and not somebody only pretending to do so.

In a preferred solution, the proof of possessing the wall and/or pillar structure may need to be renewed after a certain period, for example after a period of e.g. 5 years, and the blockchain system may chose arbitrarily one segment number of the wall to be disassembled by a robot device according to the present invention. It may read out backwards the sequence of stone-ID recovering at least 95% of the ID in the correct sequence. As a result the robot device may be able to proof that the whole wall was 5 years in possession; and the stones or solid material pieces may be applied to build a new wall and/or pillar segment.

According to a yet further preferred embodiment, the construction system may further comprise an anti-theft protection device for the robot device, said anti-theft protection device preferably being provided by a security wire, and/or wherein the robot is configured for automated attachment to and/or detachment from an antitheft protection device. The risk of the robot device to be stolen may thereby be reduced.

Such theft-protection may particularly be suitable for a robot device being mobile, lightweight and small. Due to the high cost, such robot device may likely become a target to theft. Especially, when operated near or on a public ground, theft protection may become important.

Preferably, the robot device may attach itself to a security wire, which is hard to break. Such security wire may either be part of the marking device, such as sensor wire, or it maintains at a fixed distance to it. Furthermore, when the robot device detects the marking device, it would also be able to detect the security wire and attach the mobile platform to it.

According to a preferred solution, the robot may be configured to attach itself to a security wire. Thereby, it can pass a section of the security wire, where the security wire itself is attached to a ground hook or the like. For this purpose, the robot device may first attach the end of the robot arm behind a ground hook, then detach the mobile platform from the security wire, traverse the ground hook and reattach the mobile platform. In a further preferred solution, the robot device may be configured to attach the robot and/or the robot arm directly to a ground hook.

In a further preferred solution, the security wire may be replaced by a pipe. Such pipe may be very hard to destroy. In case of a human path leading through the robot path, the security wire may not be laid across the human path to prevent human accidents. Instead, the robot device may be configured to attach the robot or robot arm to a door or gate defined by a wall and/or pillar structure, which may be finished or unfinished.

In a further preferred solution, the wall and/or pillar structure may not require a door or gate. The robot device may in such case be configured to detect intrusion. A gate may be replaced by a symbolic rope. Inside such rope, a security wire may be located. Thus, the robot device would attach to that rope, move the rope to the other side of the respective wall or pillar and attach itself to that side of the wall or pillar. The symbolic rope may then be closed and the robot would be able to traverse without detaching itself. In a further preferred solution, the robot device may be configured to open a rope for guests or habitants.

The present invention has been described as construction system above. However, the present invention also refers to a service system or automation system in general. Accordingly, the construction system referred to herein may likewise be a service system in general, particularly for providing different types of services by said robot device. Such service system may influence physical, ecological and social effects and interactions through the boundaries of a property, site or land plot. The robot device may be configured to construct, secure, treat, clean, extend, modifies, disassembles and/or reprocess an enclosure, such as a wall and/or pillar structure, made of solid material pieces, preferably stones, as well as a string, such as a cord or thread. Cohesion of stone and string compound may essentially be achieved by the so called "jamming effect", as discussed above. The surface of the compound may be provided by a refined layer of high quality stones, which may be connected to the string during the construction process.

The construction system or service system according to the present invention may enables to autonomously purchase supply parts and material and interaction with parcel service and suppliers, to commission, unpack, store, sort, scan and/or measure incoming goods. The owner or end-user may be provided with aggregated process information on the progress, whereas more detailed process decisions may be made autonomously by the construction system or service system or by a service provider, who may permanently be connected to the robot device.

According to a yet further preferred embodiment, the robot device may be configured to perform at least one secondary task, preferably observation of animal intrusion using an integrated camera system, preventing animal intrusion by providing light inside the wall and/or pillar structure and/or by providing motion of the robot device and/or sound. It is particularly possible to prepare and/or present video and/or picture material to an end-user, who would may then decide if an intruder is a welcome part of a garden or not. The end-user would also be able to define an animal as domestic part of the household and configure the robot device accordingly. Light inside a wall and/or pillar structure, robot motion and/or sound may be applied to train animals not the pass a threshold, such as a wall and/or pillar structure.

According to a yet further preferred embodiment, the robot device may be configured to perform a secondary task in the form of humidity control for a garden, particularly by generating a humidity map of the soil, measuring nutrition levels of the soil, identifying plants based on their leaves, measuring light intensity and/or continuously matching light intensity, humidity, nutrition levels, size of plants and/or plant types.

Preferably, a sensor attached to the robot device may be applied to create a humidity map of the soil along a pathway. With another sensor, it would be possible to measure light intensity. With a third sensor, it would be possible to measure nutrition levels of soil. Applying computational analytics it may be possible to identify plants based on their leaves. A map may continuously match light intensity, humidity, nutrition levels and size of plants to the plant type. From such map, users would be enabled to derive measures to optimize garden quality. The robot device may be configured to create such map and/or contribute to the generation of such map. One goal of such map may be to control the flora on a wall and/or pillar structure, both intended and unintended growth. Unintended growth may be especially moss and lichens. In case of unintended growth, preventive measures may be suggested by the construction system to the end-user instead of reactive solutions.

A further aspect of the present invention refers to a drive tool, preferably for a construction system or service system described above. Accordingly, a construction system or service system described above may be equipped with a drive tool described hereinafter including all different embodiments of such drive tool.

A drive tool according to the present invention may comprise a guiding portion for a string, at least one driving wheel for engaging a string to be driven, and at least a coupling portion adapted to the inner shape of a robot gripper and configured to establish a fixed coupling with a robot gripper by closing the fingers of said robot gripper. The drive tool may thus be operated while being gripped by a gripper, and the necessity of changing the end-effector during operation may be reduced or completely avoided.

According to a preferred embodiment, the drive tool may further comprise at least one wireless functionality and/or wherein the at least one driving wheel is electrically powered, preferably by battery, and/or configured for wireless operation and/or configured for receiving operational commands via a wireless connection to a robot device and/or robot. The necessity of a physical data or power connection between the drive tool and the robot may thus be avoided. Operational reliability may thereby be improved.

According to a preferred embodiment, the drive tool may comprise two driving wheels for engaging a string to be driven, said driving wheels being preferably arranged opposite to each other for enclosing a string to be driven, and/or wherein at least of the driving wheels is provided with a tensioning device, preferably a spring, for providing a tensioning force of said driving wheel against said string. This allows a secure and reliable drive process for a string, and may thus facilitate the generation of a so called jamming structure with automation equipment.

According to a further preferred embodiment, the drive tool may further comprise at least two body parts, preferably two body halves, configured to be moved relative to each other, particularly for opening and/or closing movements. The body parts may be configured to be moved relative to each other by relative movement of gripper fingers of a robot gripper. Furthermore, the body parts may be configured to be locked in an opened and/or closed position and/or wherein at least one tensioning element is provided for providing pretension to said body parts. The pretension may be oriented in an opening and/or closing direction of the body parts. Different operational positions of the drive tool may thereby be achieved with only little effort.

According to a further preferred embodiment, the guiding portion for a string is defined between the body parts in a closed position and/or wherein a driving wheel is provided on each body part. Initial engagement of a string by a driving wheel of the drive tool may thereby be facilitated.

A further aspect of the present invention refers to a string device, preferably for a construction system or service system and/or for a drive tool described above. Accordingly, a construction system or service system described or also a drive tool described above may be equipped with a string device described hereinafter including all different embodiments of such string device.

A string device according to the present invention may comprise a string, a package for said string and two connector end pieces attached to the ends of said string, wherein the string is guided through a guide through opening of said package and wherein one of the connector end pieces is arranged within the package and/or one of the connector end pieces is arranged outside the package. Such a string device allows an easy integration of a string into a robot device for driving and deploying said string. Such a string device may particularly be attached to a driving tool for automated driving of a string. Further to this, such string device may be replaced with only little effort, and with only little risk of the string being entangled.

According to a further preferred embodiment of the string device, the connector end pieces are configured as magnetic end pieces and/or are configured to establish a holding connection with the connector end piece of another string, preferably a holding connection with a portion of the package in between two respective connector end pieces. It may therefore not be required to move the respective string entirely out of a package in order to establish a holding connection with another string, and therefore the handling effort may be reduced.

According to a further preferred embodiment, the string device may further comprise a guiding device for said string, preferably a guide through pipe, being attached to the package and/or extending from the guide through opening of the package and/or extending from an outer side of the package and/or wherein said guiding device is attached to the package via an attachment flange. The stability of connection between the guiding device and the package may thereby be improved.

According to a further preferred embodiment of the string device, the guiding device may comprise an exposing portion for exposing a string guided through said guiding device, wherein the exposing portion is preferably provided by an interruption of and/or an opening in said guiding device, and/or wherein said string may be engaged by a drive tool thorough said exposing portion, particularly for driving and/or pulling said string out of said package. Engagement of the string by a drive tool may be facilitated and a reliable driving functionality ensured.

According to a further preferred embodiment, the string device may further comprise an attachment portion for the attachment of a drive tool, preferably configured as platform device, and/or wherein the attachment portion and the guiding device are fixedly attached to one another and/or provided as an integral component. In particular, the attachment portion may support two separate portions of the guiding device. The exposing portion may be provided between these two separate portions of the guiding device.

According to a further preferred embodiment, the string device may further comprise an identification device for identification of the package, the string, the guiding device and/or the attachment portion and/or the position and/or orientation of the guiding device and/or the attachment portion and/or wherein the identification device is provided on the attachment portion and/or guiding deice. Automation may thereby be enhanced in particular automated handling and string drive processes.

According to a further preferred embodiment, the connector end pieces may have a larger size and/or diameter than the string and/or a larger size and/or diameter than the guide through opening of the package and/or than the guide through opening of the guiding device. A connector end piece arranged within the package may be configured to be blocked at said guide through opening of the package and/or at said guide through opening of the guiding device. The string may therefore remain coupled with the package even at the end of a drive process. Furthermore, the connector end piece arranged outside the package may be fixedly arranged at the distal end of the guiding device, preferably by a press fit. Unintended removal or dislocation of said connector end piece may thereby be avoided.

According to a further preferred embodiment, the package, the guiding device and/or the attachment portion are made from decomposable material. and/or may be decomposable within a time of more than 1 year, preferably more than 3 years or more than 5 years. Accordingly, the package and/or guiding device may remain in a finalized construction, such as a wall and/or pillar structure and decompose in time. The overall handling and string deployment may be facilitated.

A further aspect of the present invention refers to a robot device, preferably for a construction system according to the above description, the robot device comprising a robot with a gripper and a drive tool according to the above description and/or a string device according to the above description.

A further aspect of the present invention refers to a robot device, preferably for a construction system according to the above description, the robot device being configured for constructing a wall and/or pillar structure with a supporting portion and a covering portion for covering the supporting portion, the supporting portion being provided by solid material pieces and at least one string for jamming at least some of the solid material pieces and the covering portion comprising at least one covering device and the string and the covering device being attached to each other.

A further aspect of the present invention refers to a planning and/or operation device, preferably to a smartphone and/or a tablet, comprising an application for planning the course and/or size of a wall and/or pillar structure to be built, for receiving data from a robot device and/or for initiating the purchase and/or delivery of construction material and/or construction equipment. Such a planning and/or operation device may be part of a construction system described above.

A further aspect of the present invention refers to a method for operation of a construction system, preferably of a construction system according to the above description, comprising at least the steps of laying out a marker device for defining the contour and/or position of a wall and/or pillar structure to be built, placing a robot device close to and/or at the marker device, and constructing a wall and/or pillar structure along and/or at the marker device.

According to a preferred embodiment of the method, functional markers are placed subsequent to the laying out of the marking device.

According to a further preferred embodiment of the method, a robot device is delivered and/or activated, particularly subsequent to the laying out of the marking device or before the laying out of the marking device.

According to a further preferred embodiment of the method, a robot device follows the marking device and generates a map, particularly before constructing a wall and/or pillar structure.

According to a further preferred embodiment of the method, a robot device scans and models the environment, particularly during and/or parallel to the generation of a map.

According to a further preferred embodiment of the method, evaluation of data generated by the robot device is conducted, particularly manual and/or automated data evaluation.

According to a further preferred embodiment of the method, material packages and/or construction material is detected by the robot device.

According to a further preferred embodiment of the method, a storage area for material packages and/or construction material is enclosed.

The details and/or advantages described above with regard to the construction system likewise apply to the method for operating a construction system described above. Also, the details and/or advantages described above with regard to the drive tool, string device, robot device and/or the planning and/or operation device likewise apply to an accordingly equipped construction system.

A further aspect of the present invention refers to a construction, particularly to a wall and/or pillar structure, comprising solid material pieces and a string for jamming said solid material pieces, wherein at least some of the solid material pieces are made from basalt and/or are at least section wise covered by basalt material.

A further aspect of the present invention refers to a construction, particularly wall and/or pillar structure, comprising a supporting portion and a covering portion for covering the supporting portion, the supporting portion being provided by solid material pieces and at least one string for jamming at least some of the solid material pieces, wherein the covering portion comprises at least one covering device and wherein the string and the covering device are attached to each other and wherein the supporting portion and/or the covering portion comprise basalt material and/or dunite and/or olivine material.

According to a preferred embodiment, a plurality of solid material pieces and/or covering devices are made of basalt rock and/or dunite and/or olivine material and/or covered by basalt material and/or dunite and/or olivine material and/or exposed to air and/or wherein the basalt material and/or dunite and/or olivine material is exposed to weathering and/or configured for weathering and removing carbon dioxide from the atmosphere.

According to a preferred embodiment, at least some of the solid material pieces and/or covering devices of the covering portion are covered with powder of basalt rock and/or dunite and/or olivine material and/or microparticles of basalt rock and/or dunite and/or olivine material are exposed to the atmosphere for enhanced weathering.

According to a preferred embodiment, the basalt powder and/or dunite and/or olivine powder may have a grain size of more than 5 micro meters, more than 10 micro meters, more than 15 micro meters, more than 17.5 micro meters or more than 20 micro meters. Furthermore, the basalt powder and/or dunite and/or olivine powder may have a grain size of less than 50 micro meters, less than 40 micro meters, less than 30 micro meters, less than 25 micro meters or less than 22.5 micro meters. The optimal grain of the basalt powder and/or dunite and/or olivine powder may be 20 micro meters or about 20 micro meters. The size may refer to the mean size of the powder material.

According to a preferred embodiment, the basalt powder and/or dunite and/or olivine material may be attached to the solid material pieces and/or the covering devices of the covering portion by a slurry and/or a gel and/or a glue material.

According to a preferred embodiment, the slurry and/or gel and/or glue material is permeable for air and/or configured for dissolving, preferably for dissolving in a timeframe between 6 months and 18 months, preferably about 12 months. The weathering of the basalt material may therewith not be affected.

According to a further preferred embodiment, a basalt powder or dunite or olivine powder material may be formed to particles of a size of at least 0.5 mm, preferably more than 1 mm or more than 3 mm or more than 5 mm and/or less than 10 mm and these particles may be arranged within the supporting portion and/or the covering portion.

It may furthermore be beneficial, if the supporting portion and/or the covering portion and/or the top cover portion comprises at least one pipe, filling opening and/or tank for filling rock particles, preferably grinded rock particles, and/or a slurry and/or gel and/or glue material with rock material, more preferably for filling rock particles from basalt and/or dunite and/or olivine.

Furthermore, the at least one pipe, filling opening and/or tank may be configured for filling rock particles at an upper portion of the supporting portion and/or the covering portion and/or the top cover portion and/or for distributing the rock particles throughout the supporting portion and/or the covering portion by a stream of liquid, preferably water.

It may also be beneficial, when the supporting portion and/or the covering portion comprises a filter and/or removal opening for filtering and/or removing rock particles, particularly weathered rock particles, in a lower portion of the supporting portion and/or the covering portion, particularly for removing weathered rock particles from drainage water.

According to a further preferred embodiment, at least one sensors may be provided, preferably arranged within the supporting portion and/or the covering portion, said sensor being configured for detecting the weathering status of rock particles.

Accordingly, grinded rock particles comprising basalt and/or dunite or olivine may be inserted on the upper side of the construction into the supporting portion and/or covering portion and then distributed throughout the supporting portion and/or covering portion by a stream of water from above. The particles may fill the spaces of the covering portion without blocking fresh air from passing through the covering portion.

During a certain time period, for example, one year or three years, the particles may start to dissolve, enable weathering of the basalt rock or dunite or olivine or other materials and all residues may be washed through the covering portion. After said time period, said particles may be removed by collecting them in the lower part of the construction by applying a filter which removes these particles from drainage water.

In a preferred solution, dissolution of the particles may be achieved or enhanced through application of charcoal. Charcoal and rock powder may be mixed, for example in a relationship of 1:1, and then compressed under pressure and heat into the final particle shape. Such particles may be arranged within the supporting portion and/or covering portion.

In another preferred solution, dissolution of the particles may be achieved and/or maintained at a desired rate through application of wood pellets. Rock powder may be added to the wood during pellet production. Natural lining inside of the wood may glue the pellets together and prevent fast dissolution. The benefit for application of charcoal or wood inside of the particles may be that both are a natural source of carbon dioxide during their own weathering process. Thus, rock powder may be enclosed by a natural emitter of carbon dioxide.

A further aspect of the present invention refers to a construction, particularly to a wall and/or pillar structure, comprising solid material pieces and a string for jamming said solid material pieces, wherein at least some of the solid material pieces are made from basalt and/or are at least section wise covered by basalt material and/or dunite and/or olivine material.

A further aspect of the present invention refers to a construction, particularly wall and/or pillar structure, comprising a supporting portion and a covering portion for covering the supporting portion, the supporting portion being provided by solid material pieces and at least one string for jamming at least some of the solid material pieces, wherein the covering portion comprises at least one covering device and wherein the string and the covering device are attached to each other and wherein the supporting portion and/or the covering portion comprise basalt material and/or dunite and/or olivine material.

Furthermore, the construction system according to the present invention may be configured to provide and/or generate a construction according to any one of the above mentioned configurations.

A further aspect of the present invention refers to a method for servicing a construction according to the above description, the method comprising the steps of frequently and/or periodically applying basalt material and/or dunite and/or olivine material to the solid material pieces and/or to covering devices of a covering portion.

A further aspect of the present invention refers to a method for servicing a construction according to the above description, the method comprising the steps of frequently and/or periodically applying basalt material to the solid material pieces and/or to covering devices of a covering portion.

The features and advantages of the various embodiments of the present invention will, in the following, be described with reference to the Figures.

Figure 2:
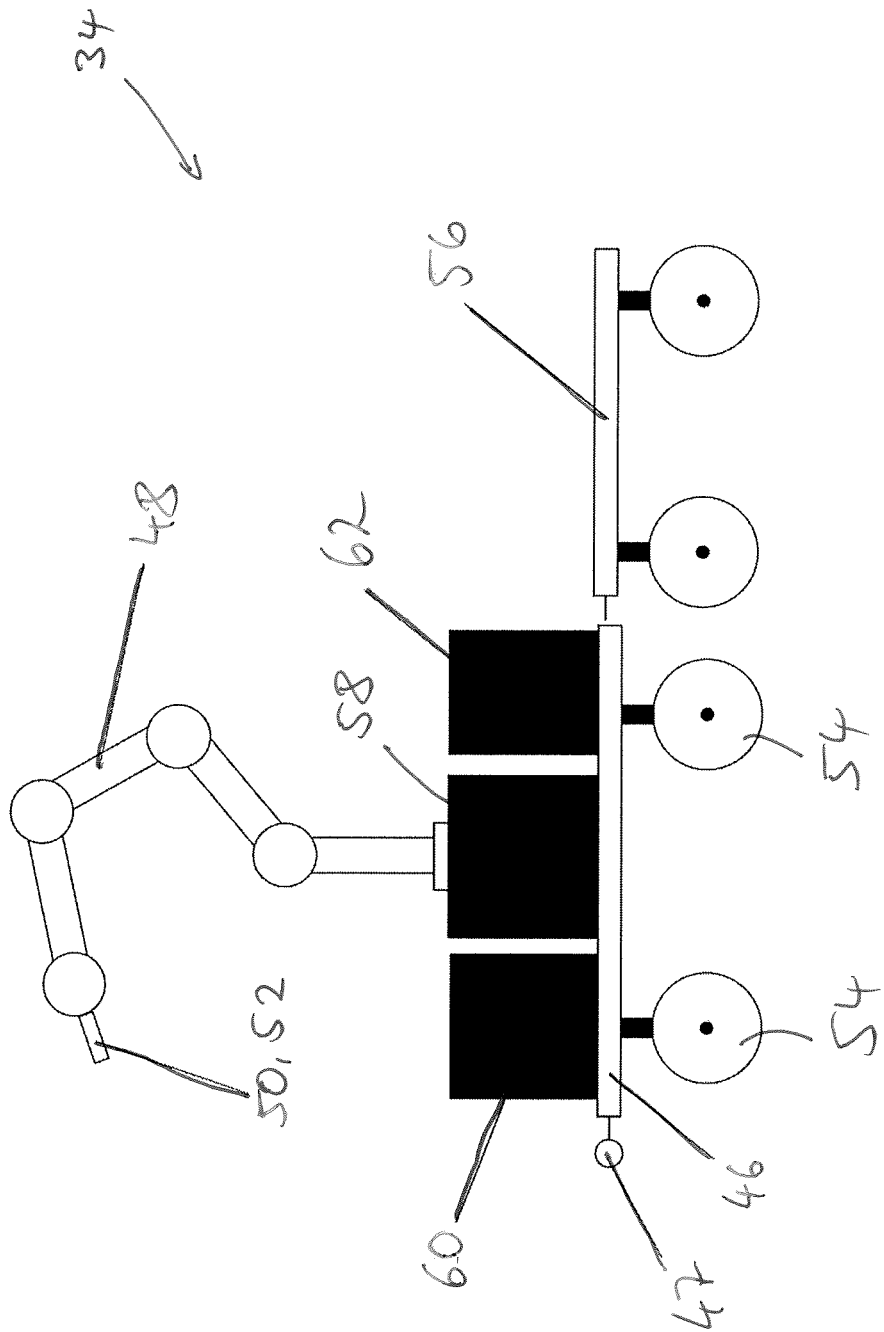
Figure 3:
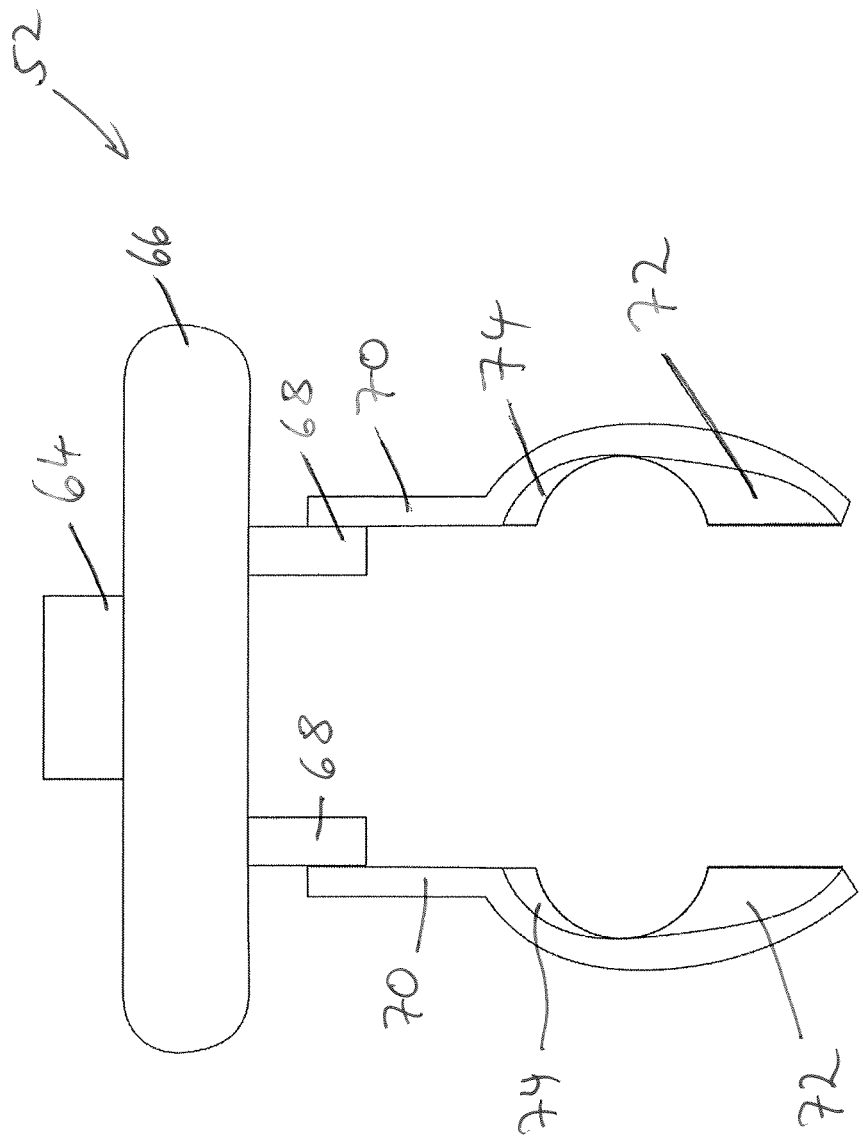
Figure 4:
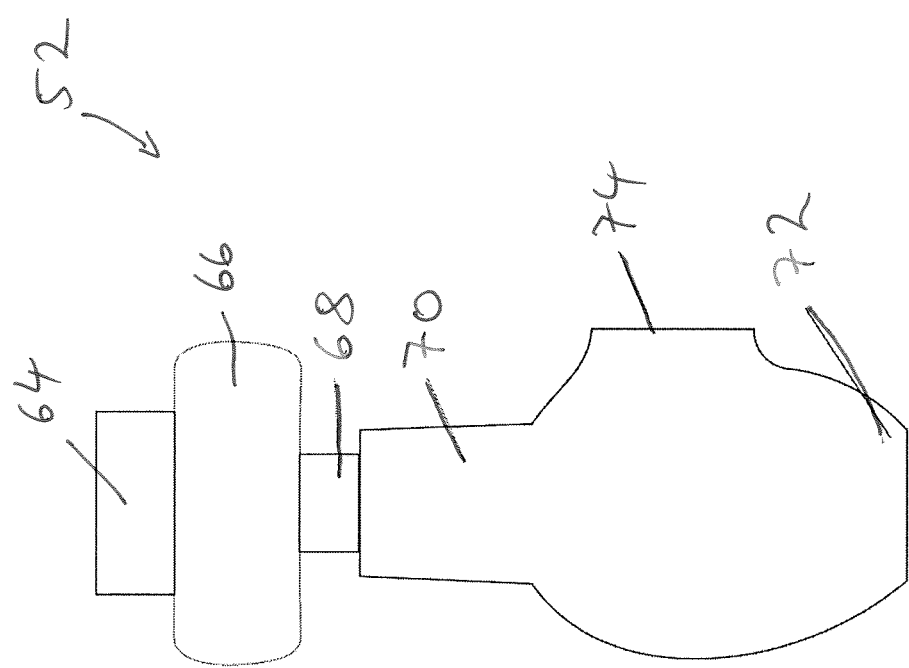
Figure 5:
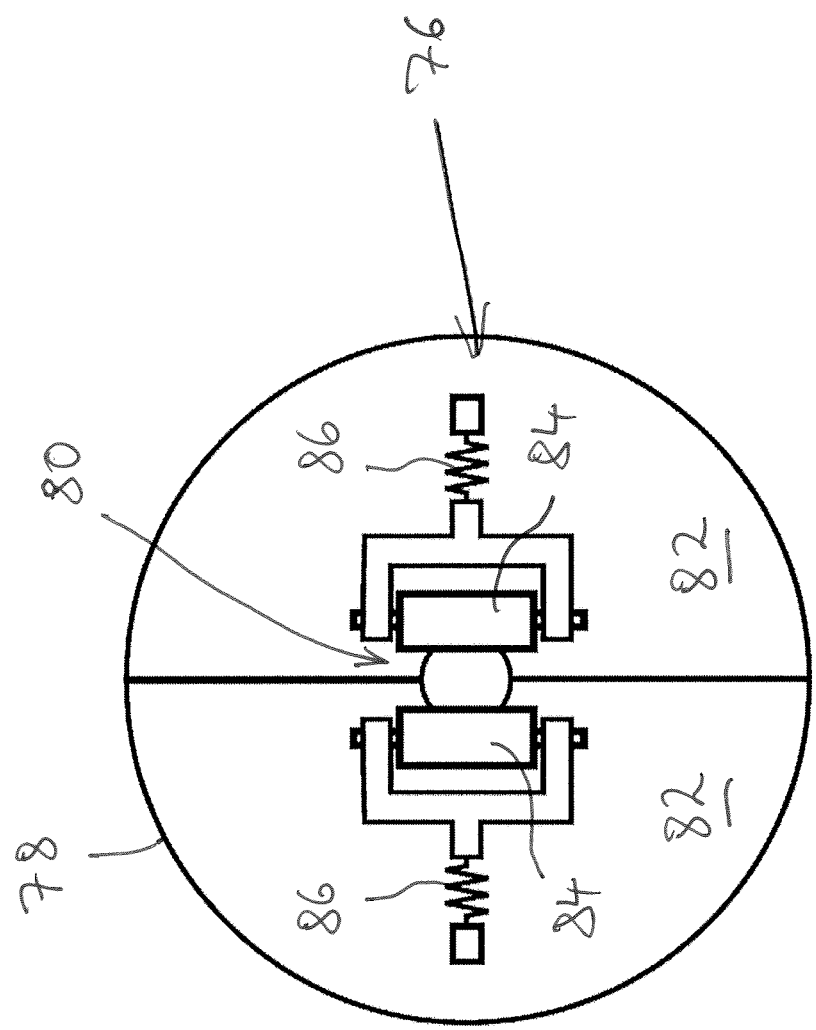
Figure 6:
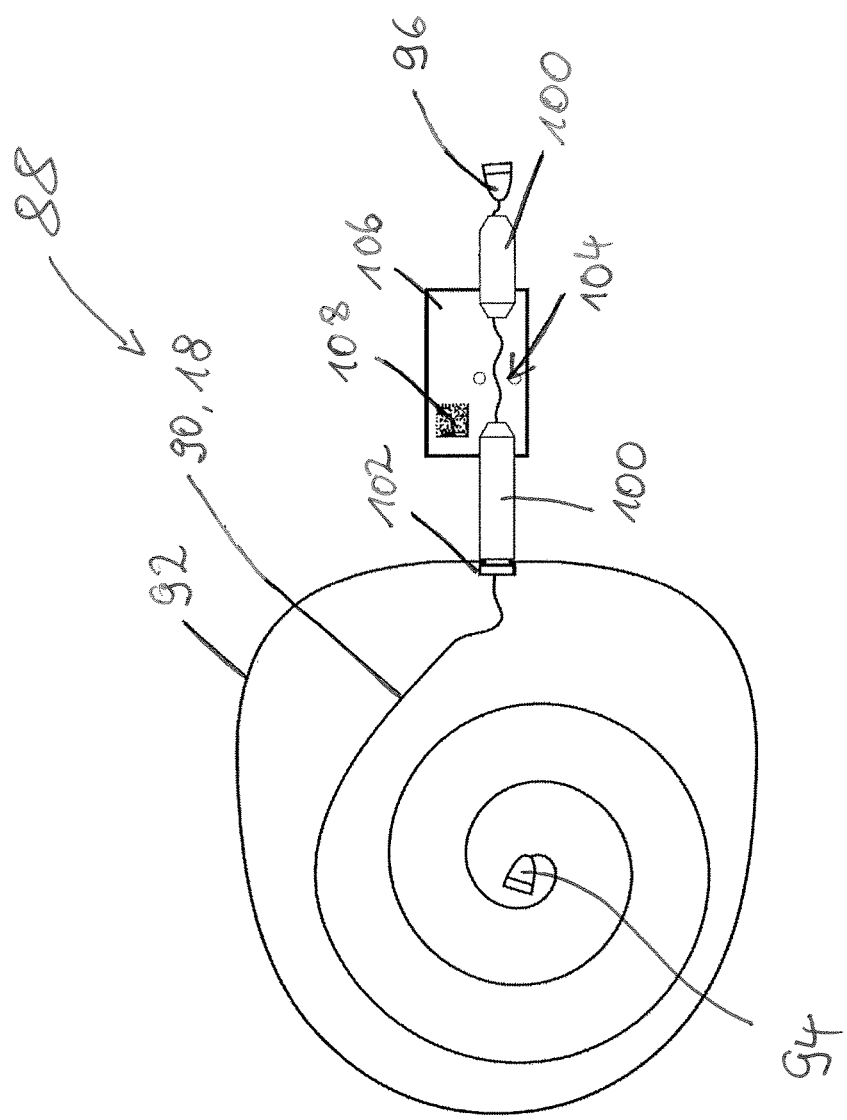
Figure 7:
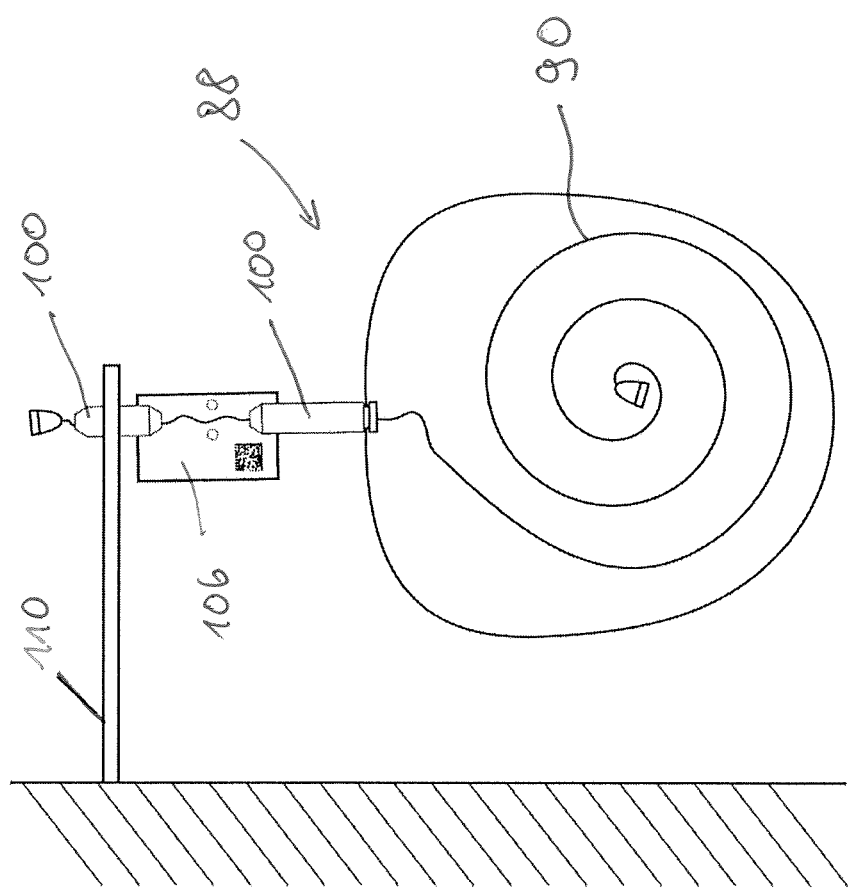
Figure 8:
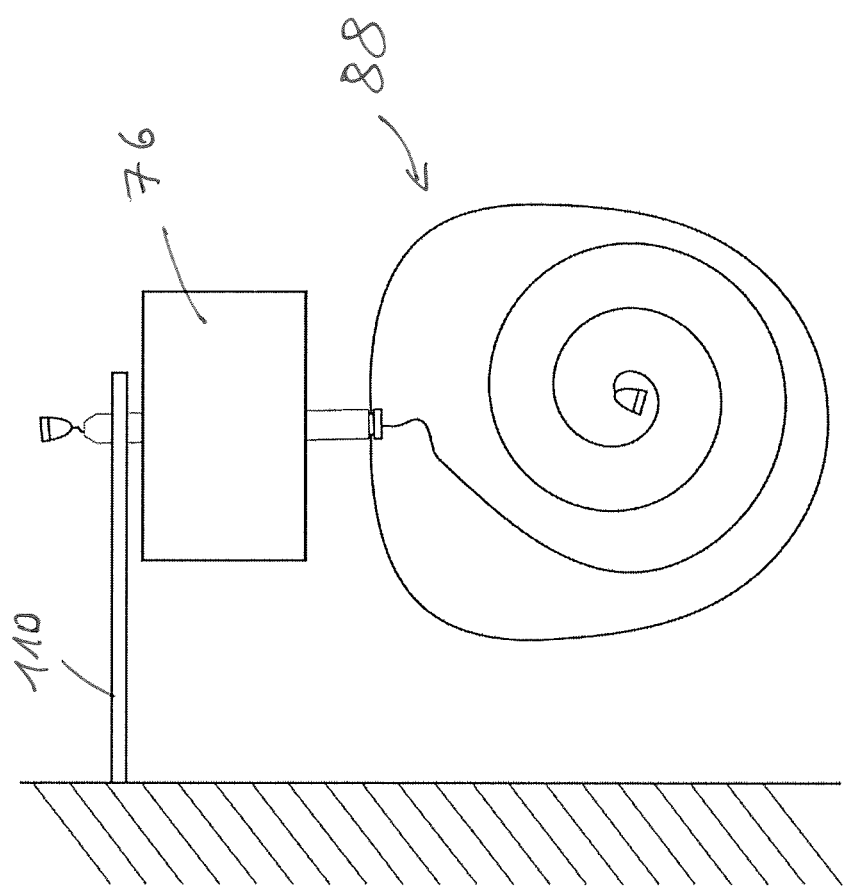
Figure 9:
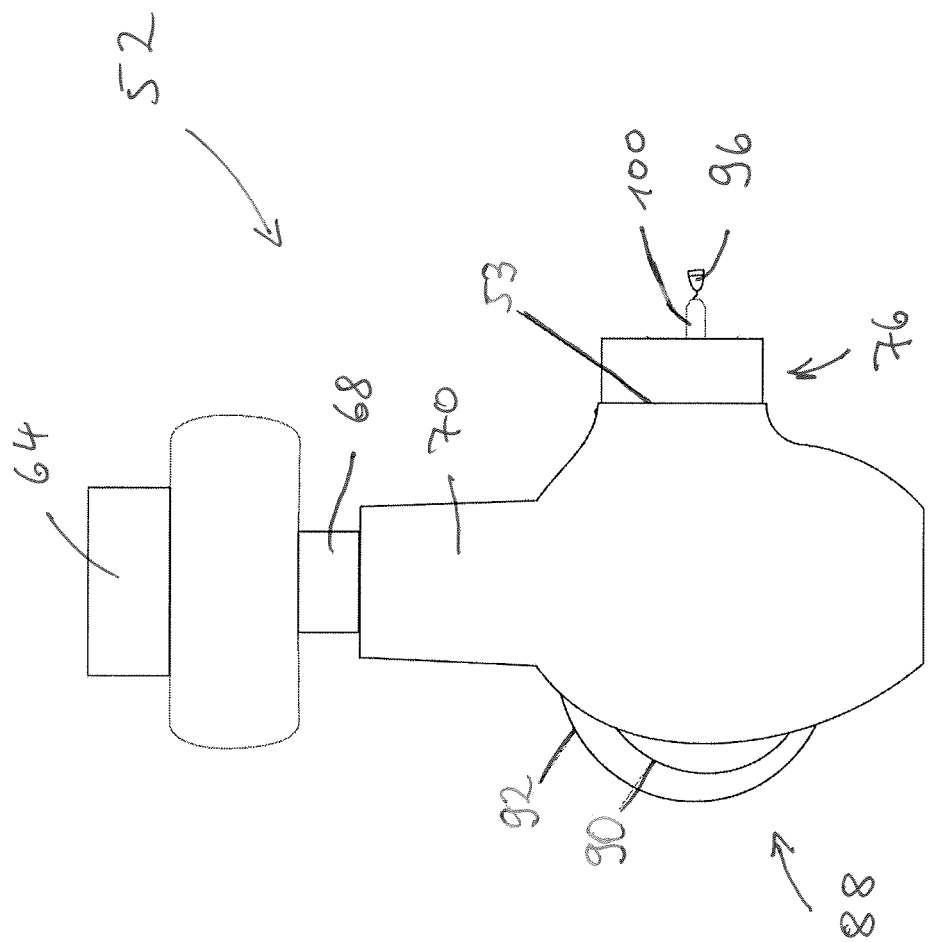
Figure 10:
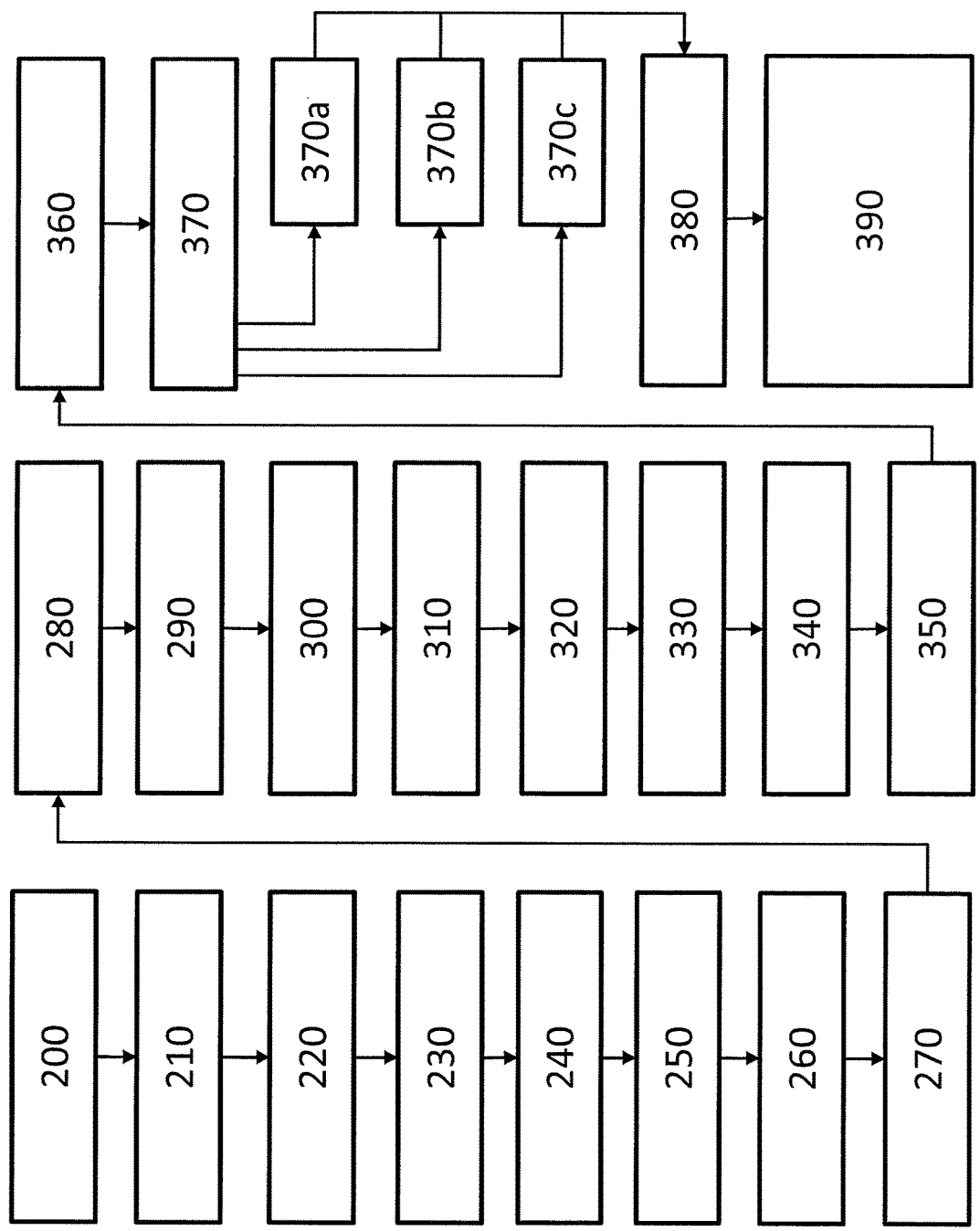

FIG. 1 shows a schematic plan view of a marking device and an adjacent construction according to embodiments of the present invention, FIG. 2 shows a side view of a robot device according to an embodiment of the present invention, FIG. 3 shows a schematic view of a gripper of a robot device according to an embodiment of the present invention, FIG. 4 shows a schematic side view of the gripper of FIG. 3, FIG. 5 shows a schematic view of a drive tool according to an embodiment of the present invention, FIG. 6 shows a schematic view of a string device according to an embodiment of the present invention, FIG. 7 shows a schematic view of the string device of FIG. 6 arranged in a vertical position, FIG. 8 shows a schematic view of the string device of FIG. 6 arranged in a vertical position with a drive tool attached, FIG. 9 shows a schematic view of the gripper of FIGS. 3 and 4 with a drive tool and string bag arranged between the gripper fingers, FIG. 10 shows a schematic flow diagram of a method according to an embodiment of the present invention.

The upper side of FIG. 1 shows a schematic plan view of a construction 10 according to an embodiment of the present invention. The construction 10 may particularly be a wall or pillar or any other type of architectural structure.

The construction 10 comprises a supporting portion 12 and a covering portion 14 for covering the supporting portion 12. The supporting portion 12 may be provided by solid material pieces 16 and at least one string 18 for jamming at least some of the solid material pieces 16. The covering portion 14 comprises at least one covering device 20, preferably a plurality of covering devices 20. The string 18 and the covering devices 20 are attached to each other, which is described in more detail below.

The covering portion 14 is arranged around the supporting portion 12 on a plurality of sides of the supporting portion 12. In particular, the covering portion is arranged around the supporting portion 12 on vertically extending sides. The covering portion 14 may provide a cast for the supporting portion 12, particularly a cast for a compound of the solid material pieces 16 and the string 18 of the supporting portion 12.

It may be comprehended from FIG. 1 that the covering devices 20 are larger than the solid material pieces 16, and may also be made from a different material and/or have a different optical appearance than at least some of the solid material pieces 16 of the supporting structure 12. The solid material pieces 16 may particularly be provided as crushed rocks, angular rocks, granular stone material and/or broken stones. It is also possible that the solid material pieces 16 are made from and/or contain glass material and/or glass gravel and/or glass chippings. The solid material pieces 16 may be jammed and/or stamped and/or compressed, preferably for increasing a jamming effect.

As may further be comprehended from FIG. 1, the string 18 may be at least section wise laid within and/or throughout the supporting portion 12 and/or between the solid material pieces 16 and/or loosely laid and/or at least section wise tightened, preferably for increasing a jamming effect. The string 18 may be arranged in a pattern alternatingly running between a central area 22 of the supporting portion 12 and different covering devices 20.

The solid material pieces 16 of the supporting portion 12 may be compressed and/or stamped against the covering portion 14 and/or against the covering devices 20 and/or while being held and/or limited by the covering devices 20. At the same time, the covering portion 14 may allow shifting and/or movements of the solid material pieces 16. Furthermore, the covering portion 14 and/or the covering devices 20 may be fixed and/or held by the supporting portion 12, preferably by the compressed and/or stamped and/or jammed solid material pieces 16 and/or by the string 18, particularly by a compound made of the solid material pieces 16 and the string 18.

The covering devices 20 may be made of and/or comprise a stone and/or glass and/or metal material. The at least one covering device 20 may comprise a visible side 24 facing away from the supporting portion 12 and furthermore a functional side 26 facing the supporting portion 12. The string 18 is attached to the covering device 20 at the functional side 26.

The attachment between the string 18 and the at least one covering device 20 may be provided via a form fit and/or non-positive connection and/or via an adhesive. The covering device 20 may comprise at least one outer component 28 and an attachment element 30 for the attachment with the string 18. The attachment element 30 may be provided on the functional side 26, whereas the visible side 24 faces away from the attachment element 30. The attachment element 30 may be configured as a hook and/or eye and/or notch, to which the string 18 is attached and/or hooked.

The lower side of FIG. 1 shows a marking device 32 for defining the course, form and/or position of a construction 10, such as a wall and/or pillar structure. Such marking device 32 may, for example, be a sensor wire or cord or strap or belt, and may be purchased by an end-user and laid out on a private property.

The marking device 32 may be is equipped with a measure scale, not shown here, which can be detected by humans and/or a robot device 34, as shown in FIG. 2 and discussed in greater detail below. The marking device 32 and the robot device 34 may constitute a construction system within the meaning of the present invention The marking device 32 may further comprise a start marker 36 for defining the start and/or position of a wall and/or pillar structure. Furthermore, the marking device 32 may comprise an end marker 38 for defining the end and/or position of a wall and/or pillar structure. The markers 38 and 38 may be placed on the marking device 32 and may be read by humans and/or a robot device 34.

As may further be comprehended from FIG. 1, a platform 40 may be provided adjacent to the marking device 32. The platform 40 may be connected to the marking device 32, and may comprise a plurality of platform elements 42. The platform 40 may provide a driving and/or rolling surface for a robot device 34, and protect the wheels of a robot device 34 from a muddy underground and the underground does not get stressed, if the robot device requires many passing.

Furthermore, the platform 40 may comprise a storage section 44 for storing construction material, such as covering devices 20. The storage section 44 may be as long as the marking device 32 and/or as long as a construction 10 to be built, thus, many material pieces, such as stones or covering devices 20 may be accessible for the robot device 34 at the same time and can be chosen according to parameters like form, transparency, colour and/or centre of gravity. If the stones feature a hook as an assembly position, such as the case in the covering devices 20, it should be made possible, that the hook is attached to a fixed and/or specific position on the storage section 44.

FIG. 2 shows a side view of a robot device 34 according to an embodiment of the present invention. The robot device 34 may comprise a mobile platform 46 and a robot 48. The robot 48 may be configured with a serial kinematic arrangement, and be equipped with an end-effector 50. The end-effector may be configured as gripper 52, as will be discussed with reference to FIGS. 3 and 4 in greater detail below.

The robot 48 may be arranged on the mobile platform 46 for being moved along a pathway. The mobile platform 46 may be equipped with wheels 54, which may be driven and/or not-driven wheels. Furthermore, the mobile platform 46 may comprise and/or be connected to an extension or trailer 56. The mobile platform may also comprise a sensor device 47, at least for detecting the marking device 32.

The mobile platform 46 may furthermore be equipped with one or a plurality of containers 58, 60, and 62. The container 58 may be a storing box for rain protection, in particular for rain protection of the robot 48. In case of rain, the robot 48 may move itself and/or its arm into the container 58, which may subsequently be closed. Containers 60 and 62 may be storage containers for construction material, such as solid material pieces 16 and/or covering devices 20. Furthermore, string devices, which will be discussed in the following in greater detail, may be arranged on the trailer 56.

FIG. 3 shows a schematic view of a gripper 52 of a robot device 34 according to an embodiment of the present invention, and FIG. 4 shows a schematic side view of the gripper 52 of FIG. 3. The gripper 52 comprises a robot flange 64 for connecting the gripper to the robot 48. The gripper 52 further comprises a housing 66, and two gripper fingers 68. The gripper fingers 68 comprise a gripping portion 70, which may have the form of a gripper hand. The gripping portion 70 may comprise a depression 72, which may allow grabbing multiple stones or solid material pieces from a container 60 or 62. Also, the depression 72 can be applied to grab a single larger stone from a container 60 or 62, such as a covering device 20 for the covering portion 14.

Furthermore, the gripping portion 70 may comprise a coupling section 74 for coupling with a drive tool 76, which is discussed with reference to FIG. 5 in greater detail. The drive tool 76 may have a cylindrical overall form, in order to fit to the coupling section 74. In particular, the drive tool 76 may have a coupling portion 78 for coupling with a coupling section 74 of the gripping portion 70. The drive tool 76 comprises furthermore a guiding portion 80 for a string. The guiding portion 80 may be a hole or opening between two body halves 82. The body halves 80 may be moved relative to each other or opening and/or closing operations.

The drive tool 76 comprises also driving wheels 84, which may be pressed by tensioning elements 86, such as springs, together. The driving wheels 84 may be connected to electrical motors. The drive tool 76 may be configured for wireless operation. It may comprise a battery and wireless communication components for interaction with the robot 46 and/or robot device 34. The command to activate the driving wheels 84 and lay out string may accordingly be submitted via wireless communication.

FIG. 6 shows a schematic view of a string device 88 according to an embodiment of the present invention. The string device 88 may comprise a string 90, a package 92 for said string 90 and two connector end pieces 94 and 96 attached to the ends of said string 90. The string 90 may be rolled and/or folded within the package 92. The package 92 may have the size of a palm.

The string 90 may be guided through a guide through opening 98 of said package 92 and the connector end piece 94 may be arranged within the package 92, and the connector end piece 96 may be arranged outside the package 92. The package 92 may be a bag or made from a thin layer material.

The connector end pieces 94 and 96 may each comprise a strong magnet. Thus, the string 90 of string device 88 can be connected to another string 90 of another string device 88 to form a thread of arbitrary length.

The string device 88 may further comprise a guiding device 100 for said string 90, preferably a guide through pipe, being attached to the package 92 and/or extending from the guide through opening 98 of the package 92. Said guiding device 100 may be attached to the package 92 via an attachment flange 102.

The connector end piece 94 may be larger than the guiding device 100 and/or the opening 102 to prevent the string 90 from a complete unthreading. In a preferred solution, the end of the guiding device 100 comprises a nozzle to guide the string out of the guiding device 100. In another preferred solution, the connector end piece 96 is safely located in front of the guiding device 100, e.g. by a press fitting to prevent unintended dislocation. The guiding device 100 comprises an exposing portion 104 which is exposing the string 90. The string 90 may be engaged by a drive tool 76 via the exposing portion 104. The drive tool 76 may drive and/or pull the string 90 with a defined speed out of the package 92.

Furthermore, the string device 88 may comprise an attachment portion 106 for the attachment of a drive tool 76, preferably configured as platform device, and/or wherein the attachment portion 106 and the guiding device 100 are fixedly attached to one another and/or provided as an integral component. To identify the string device 88 and/or the guiding device 100 and its corresponding position and orientation, an identification device 106 may be provided. The identification device may be arranged on the attachment portion 106.

When the string 90 is pulled out of the package 92, the connector end piece 94 is blocked at the entrance to the guiding device 100 and/or at the opening 98. The drive tool 76 would detect that the string 90 is stopped by sensing force or motion. The robot 48 can now detach the drive tool 76 from the guiding device 100 and/or from the attachment portion 106, leave the empty package 92 on top of the unfinished construction structure. The robot 48 may now grab a new string device 88 from a storage bin or container 60 or 62 and mount the drive tool 76 to a new string device 88. To do that, the robot 48 may first grabs randomly any string device 88 from a bin or container 60 or 62. Subsequently, the attachment portion 106 and/or guiding device 100 of said string device 88 may be arranged vertically in a clamping or holding device 110, as shown in FIG. 7. The robot 48 may now detach from the string device 88. Now, the identification device 108 can be scanned and the robot 48 can attach the drive tool 76, as shown in FIG. 8.

To connect a new string device 88 to an old one, the robot 48 may grabs the new string device 88 and/or drive tool 76 on the clamping device 110. Through this, position and orientation of the connector end piece 86 in front of the guiding device 96 is defined. A sensor is applied to detect the guiding device 100 of an empty string package 92 and/or a used string device 88. By identifying the identification device 108, the pose of the connector 94 inside of the old package 92 can be calculated. The robot now just moves the connector end piece 96 of the new string device to the connector end piece 94 inside the old package 92 and the magnetic effect attaches both connector end pieces 94 and 96 together, with package material in between. The old package 92 and the old guiding device 100 may remain on and/or within the construction and become covered by stone material. In a preferred solution alternative, the package 92 and the guiding device 100 are made of decomposable material and may remain for several years.

FIG. 9 shows a side view of the gripper 52 with a string device 88 grabbed by the drive tool 76. The drive tool 76 is precisely attached to the gripper 52 and the package 92 is located within the depression 74 of the gripper fingers 11.

FIG. 10 shows a schematic flow diagram of a method according to an embodiment of the present invention. The method according to the present embodiment may contain one or a plurality of the following steps 200 to 390.

In a first step 200, a user may download an application to his smartphone or tablet and/or install same thereon.

In Step 210, the user may visualize the wall as a draft. In step 220, the user may order a starter package.

In step 230, the user may select a robot device 34 from the application. The robot device 34 may be subject to buying, renting or sharing.

In step 240, package may be delivered. Such package may contain a robot 48 and/or a mobile platform 46, a marking device 32, such as sensor wire, particularly about 20 m of sensor wire, a plurality of predefined markers and/or a plurality of user defined markers.

In step 250, package the marking device 32 may be installed locally, for example, a front yard or private property.

In step 260 the robot device 34 may be installed. For installation, a setup may be followed, connection to WLAN established, and charging of a robot battery conducted. Furthermore, two boards may be stored on wheels 54 to establish the mobile platform 46 with the trailer 56.

In step 270, the robot device 34 may be connected or brought into a sensing connection with the marking device 32 for activation.

In step 280, the construction draft may be updated. The robot device 34 may follow the marking device 32 and measure distances. A construction map, such as a wall or pillar map, may be updated, and a cost plan may be updated. Also, the robot device may scan a construction ground and update a ground map.

In step 290, a big bag location may be flagged. The robot device 34 may place flags for a precise position for bags, and the location of big bags may be updated on a map.

In step 300, the user may confirm and order a wall and/or pillar structure and/or the components and material therefor. A cost plan and construction plan may be acknowledged, a map is updated, and user may confirm that big bag locations can be reached with a crane from a public and/or private street or road.

In step 310, the user may order material. Material and part order may be conducted to build a storage area. Furthermore, the user may order a big bag containing material for a supporting portion (inner compound) of a wall and/or pillar structure, and also a big bag containing material for a cover portion (outer compound) of a wall and/or pillar structure.

In step 320, material may be delivered. A crane operator may place big bags, and a sensor of the robot device 34 may confirm arrival. The robot device 34 may scan bag position and may accept the delivery.

In step 330, a storage area for string devices 88 may be built. The robot device 34 may use string devices 88 from mobile platform 46, and builds a wall and/or pillar structure as high as a mobile platform 46. An outer compound is optional and not required for a storage area.

In step 340, string devices 88 may be ordered, particularly in a large amount.

In step 350, string devices 88 may be delivered. Postal service may deliver string devices 88, and the robot device 34 may await string device delivery. A sensor may track package location, and the robot device may communicate with a parcel carrier to place string devices 88 on roll board on mobile platform 46 or trailer 56.

In step 360, string devices 88 are stored. The big bag with string rolls 88 may be heavier than robot device payload. The mobile platform 46 and/or trailer 56 may be positioned next to a storage area, and the robot device 34 may press and/or pull a big bag over onto the mobile platform 46 and/or trailer 56 for further use.

In step 370, all necessary materials are made available and/or commissioned. String material as well as solid material pieces (stones) and covering devices are available, particularly in big bags.

In step 370*a*, the materials for a supporting portion 12 (inner compound) of a construction is placed on a mobile platform 46 or trailer 56. A shovel-tool may be applied to load small stones from big bag to a box onto the mobile platform 46 or trailer 56. Up to 200 kg of stones may be stored on a mobile platform 46 or trailer 56.

In step 370*b*, the materials for a covering portion 14 (outer compound) are placed along the marking device 32. Stones or covering devices 20 are grabbed out of big bag utilizing a gripper and a camera system. The ID of each stone or covering device 20 is read, and data on cloud is searched. If not available, the respective stone or covering device 20 is scanned. This may be repeated with a plurality of stones or covering devices 20, and the stones or covering devices 20 are positioned along the marking device 32 in predefined location.

In step 370*c*, a string device 88 is grabbed from a string storage, and attached to a drive tool 76 with to enable winding up or unwinding of the respective string 90.

In step 380, commissioning is finished.

In step 390, the construction 10, particularly a wall and/or pillar structure, may be constructed. The construction 10 may be built in segments.

The invention claimed is:

1. A construction system for operation by an end-user, comprising:
   a robot device configured for constructing a wall and/or pillar structure; and
   at least one marking device for defining a course, form and/or position of the wall and/or pillar structure,
   wherein the marking device is detectable by the robot device,
   wherein the robot device is configured to construct the wall and/or pillar structure at and/or along the marking device, and
   wherein the robot device is configured for constructing the wall and/or pillar structure from solid material pieces and a string for jamming said solid material pieces.

2. The construction system according to claim 1, wherein the marking device is configured as and/or comprises an elongated and/or flexible device and/or is configured to be laid out by an end-user along an intended course and/or position of the wall and/or pillar structure.

3. The construction system according to claim 1, wherein the marking device comprises a feature marker for marking the position of features and/or extensions and/or interruptions or gaps of the wall and/or pillar structure to be built, and/or wherein the marking device comprises a storage marker for marking the position of a material storage for construction material and/or wherein the marking device comprises a supply marker for marking the position of a power supply and/or a water supply connection.

4. The construction system according to claim 1, further comprising a platform providing a driving and/or rolling surface for the robot device, the platform consisting of a plurality of platform elements, and/or wherein the platform is connected with the marking device and/or wherein the platform comprises a storage section for storing construction material and/or wherein the platform comprises at least one elevation ramp and/or elevation element for providing a driving and/or rolling surface on an elevated level.

5. The construction system of claim 4, wherein the elevated level is elevated relative to at least one further platform element.

6. The construction system according to claim 1, wherein the robot device is configured for constructing the wall and/or pillar structure with a supporting portion and a covering portion for covering the supporting portion, the supporting portion being provided by the solid material pieces and the string and the covering portion comprising at least one covering device, wherein the robot device is configured for attaching the string to the at least one covering device.

7. The construction system according to claim 1, wherein the robot device is configured for following the marker device and for reading markers and/or for drawing a contour of the wall and/or pillar structure into a map and/or for creating a 3D model of the environment.

8. The construction system according to claim 7, wherein the 3D model and/or pictures of the ground for the wall and/or pillar structure to be built are submitted to a provider and/or cloud for data analysis for automated data analysis and/or manual data analysis by an expert.

9. The construction system according to claim 1, further comprising an ordering device for ordering construction material based on the data collected by the robot device and/or further analyzed and/or wherein the robot device is configured to detect and/or identify delivered construction material and/or initiating opening sequences for material packages.

10. The construction system according to claim 1, wherein the robot device comprises a robot configured with a serial kinematic arrangement, and/or a mobile platform for moving a robot.

11. The construction system according to claim 10, wherein the robot and/or the mobile platform comprises a sensor device for detecting the marking device and/or a detection device for detecting packaged material and/or material packages with or without detection markers.

12. The construction system according to claim 1, wherein the robot device is provided with an end-effector configured as a gripper and/or with a drive tool for driving a string for unwinding a string material and/or for driving a string material out of a string package, and/or wherein the gripper is configured for gripping solid material pieces, and/or said drive tool for driving a string and/or wherein the gripper is electrically operated.

13. The construction system according to claim 12, wherein the solid material pieces are stones.

14. The construction system according to claim 1, wherein the robot device is configured for collecting, storing and/or transmitting block chain related data about solid material pieces embedded within the wall and/or pillar structure.

15. The construction system according to claim 1, further comprising an anti-theft protection device for the robot device, said anti-theft protection device being provided by a security wire, and/or wherein the robot is configured for automated attachment to and/or detachment from an anti-theft protection device.

16. A robot device for a construction system according to claim 1, the robot device being configured for constructing the wall and/or pillar structure with a supporting portion and a covering portion for covering the supporting portion, the supporting portion being provided by solid material pieces and at least one string for jamming at least some of the solid material pieces and the covering portion comprising at least one covering device and the string and the covering device being attached to each other.

17. A planning and/or operation device, comprising an application for planning the course and/or size of a wall and/or pillar structure to be built, for receiving data from a robot device and/or for initiating the purchase and/or delivery of construction material and/or construction equipment.

18. The planning and/or operation device of claim 17, wherein the device is a smartphone or a tablet.

19. A method for operation of the construction system according to claim 1, comprising at least the steps of:
   laying out the marker device for defining a contour and/or position of the wall and/or pillar structure to be built,
   placing the robot device close to and/or at the marker device, and
   constructing the wall and/or pillar structure from solid material pieces and the string for jamming said solid material pieces along and/or at the marker device.

* * * * *